Patented Mar. 9, 1954

2,671,747

UNITED STATES PATENT OFFICE 2,671,747

METHOD OF PREVENTING ADHESION

James G. Lander, Cincinnati, Ohio, assignor to Diamond Alkali Company, Cleveland, Ohio, a corporation of Delaware No Drawing. Application March 11, 1950, Serial No. 149,219

3 Claims. (Cl. 154—138)

This invention relates to a method for preventing the adhesion of aqueous adhesive silicate glass compositions to heated metal surfaces, and more particularly relates to a method for preventing the adhesion of such silicate glasses to apparatus used in the manufacture of laminated paper articles.

One of the steps in a typical paper laminating operation involves the pressing of the composite sheet after the adhesive has been applied to the plies and such plies have been arranged in laminated relationship. Generally, in the manufacture of corrugated paperboard, this operation is conducted by passing an advancing laminated web of paper over a series of heated platens and pressing the web against the heated platens by means of one or more rollers, whereby the silicate glass is dehydrated and the laminations are united, thus forming a bond between the laminates.

In the manufacture of corrugated paperboard and similar laminates, the silicate glass adhesive may, for example, be applied to the peaks of the corrugations on one side of a corrugated sheet, which sheet is then contacted with a plane-surface facing sheet, and the composite thus formed passed over heated platens, while being subjected to pressure insufficient to destroy the corrugations of the corrugated member but sufficient to effect the bonding of the paper sheets. Thereafter, in accordance with this exemplary method of forming 3-ply laminates, the laminated structure may be coated a second time with an adhesive silicate glass at the peaks of the exposed corrugated surface of the laminate, and the thus-coated structure then formed brought into contact with a second plane-surface and the whole laminate again passed in contact with heated platens, while being subjected to pressure insufficient to destroy the corrugations of the corrugated member but sufficient to effect bonding of the laminate.

Difficulties in the manufacture of such corrugated paperboard arise when aqueous adhesive silicate glass comes into contact with the corrugating and pressure rolls, and the platens of the hot plate driers, forming hard glass-like deposits thereon, thus fouling the rolls and necessitating interrupting production to remove said deposits. Further, as the laminated structure passes between the pressure rollers and the platens of the hot-plate driers, some of the adhesive silicate glass exudes from the portions of the laminate nearest the edges thereof and to be deposited upon the heated surface of the platens. After a relatively short period of time, these deposits of the exuded adhesive silicate material accumulate upon the surface of the platens and build up into ridges or mounds near the region of the edges of the moving laminated web and under the influence of the relatively intense heat of the platen surface are dehydrated to a hard, strongly adherent, solid silicate glass. These deposits are then in a position to effect the destruction of the edges of the moving laminated structure passing across the heated platen surface. Moreover, as the production of laminated webs of lesser and greater widths may be scheduled alternately during a given production period, the changeover from the lesser to the greater widths may leave deposits of the dehydrated silicate glass in a position to mar substantial areas longitudinally of the wider webs. When the accumulation of the deposits of dehydrated silicate glass are sufficient to cause the destruction of substantial areas of the wider laminated webs passing thereover, the whole operation must be interrupted and the heated platens cleaned before further production of such wider webs may be started. A major difficulty in the cleaning operation arises from the fact that the dehydrated silicate glass adheres quite strongly to the platens, requiring considerable time and hand labor to dislodge the deposit and refinish the surface.

The present invention is directed to a method for decreasing the adhesion of an adhesive silicate glass composition to heated metal surfaces generally.

Another object of the invention is to provide a method for preventing the adhesion of aqueous adhesive silicate glasses commonly employed in the paper laminating industry to the heated metal surfaces of the platens used to form laminates.

These and other objects will occur to those skilled in the art from the description of the invention set forth below.

The method of the present invention for preventing the adhesion of a dehydrated adhesive silicate glass composition to metal surfaces includes the steps of applying an aqueous solution containing urea to a heated metallic surface and evaporating the water therefrom. The method of the invention may be carried out by dissolving a suitable amount of urea in water to form a solution; for example, a solution containing from 3–20 parts of urea may be employed in an initial treatment of the heated metallic surface with which an aqueous adhesive silicate glass composition is subsequently to come in contact, by spraying or brushing the heated metallic surface with the urea-containing solution, or the urea may be dissolved in an aqueous adhesive silicate glass composition in the proportion of 3–20 parts of urea to 80–97 parts of the aqueous adhesive silicate glass. A further variation of the method may be effected by first spraying or brushing the heated metallic surface, with which the aqueous adhesive silicate glass is subsequently to come in contact, with an aqueous solution containing urea and admixing such adhesive silicate glass composition with a suitable amount of urea, for example, 3–20 parts of urea to 80–97 parts of the silicate glass contained therein, prior to the time such silicate glass composition comes into contact with the heated metallic surface.

In terms of the manufacture of corrugated paperboard, or other operation in which aqueous adhesive silicate glasses are dehydrated in contact with heated metallic surfaces, the platens, corrugator roll, and other parts of the machinery which may pick up particles of the aqueous silicate glass may be coated with a solution containing urea prior to such time as the adhesive silicate glass composition may come in contact therewith, or this treatment may be dispensed with and the urea admixed with the aqueous silicate glass compositions normally used in the bonding of paper or wood laminates. However, the preferred procedure combines these two methods. This latter procedure insures an effective continuing surface treatment which allows the dehydrated silicate glass particles to be dislodged from a metallic surface by a relatively mild force, for example, a force insufficient to mar the surface of a paper laminate moving through the heating and pressing apparatus decribed above in connection with the manufacture of corrugated paperboard.

The aqueous adhesive silicate glass compositions referred to hereinabove include as their principal ingredient an aqueous silicate glass containing from 35–45% solids and averaging, on a weight basis, one part of $Na_2O$ to 3.3 parts of $SiO_2$, with a minimum ratio of one part of $Na_2O$ to 4 parts of $SiO_2$ and a maximum ratio of one part of $Na_2O$ to 2.5 parts of $SiO_2$. In addition to the adhesive silicate glass, the composition may also contain relatively minor amounts of a wetting agent, such as alkyl aryl sulfonates or an alkylol amine, such as triethanolamine, members of which group are not subject to hydrolysis under the alkaline conditions existing in the aqueous silicate glass, and relatively small amounts, i. e., up to approximately 15% of the total weight of the composition, of such additives as soybean meal, clay, woodflour, starch, and the like, commonly found in such compositions. In order to inhibit the corrosive effects of the adhesive silicate glass compositions upon metallic surfaces, there also may be added a relatively minor amount, for example, less than 1%, of such anti-corrosive ingredients as sodium bichromate or sodium chromate. It has been found preferable, however, in the practice of the present invention to maintain the amounts of additives to the aqueous silicate glasses to a minimum and, therefore, a preferred adhesive composition will contain from 85–95% of the aqueous silicate glass having a $Na_2O:SiO_2$ ratio within the preferred range noted hereinabove, 0.1–0.2% of sodium bichromate, 0.1–0.5% of a wetting agent, as disclosed above, and from 4–14% of urea. It has been found that the urea present in the adhesive silicate compositions in the amounts given above does not deleteriously affect the adhesive qualities thereof in the bonding of laminated paper webs, in that the bond obtained thereby is stronger than the paper itself and is appreciably stronger than a bond obtainable by the use of compositions containing starch as the principal adhesive ingredient in the same type of laminate.

In order that those skilled in the art may better understand the method of the present invention and in what manner the same may be carried into effect, the following specific examples are offered:

Example 1

An aqueous adhesive silicate glass composition containing 8% of urea, 0.2% of triethanolamine, and the balance an aqueous silicate glass having approximately 37% solids, and a $Na_2O:SiO_2$ ratio of 1:3.3, is spread over the surface of a heated (350° F.) cast-iron platen and the following observations are made:

(1) The film dries rapidly to a hard, glass-like mass.

(2) The portion of the film in contact with the surface of the cast-iron plate does not give an alkaline reaction to phenolphthalein and has the crystalline appearance and taste of urea.

(3) Microscopic observations made during the dehydration of the film show the formation of a film of crystals resembling urea on the surface of the dehydrating silicate glass.

Example 2

An adhesive aqueous silicate glass having a solids content of approximately 37% and a $Na_2O:SiO_2$ ratio of 1:3.3 is spread on a heated platen (350° F.) and allowed to dry. Crystals of urea are placed on the heated platens in the region of the edge of the dried film and it is observed that the urea, upon melting, preferentially wets the cast-iron platen and displaces the silicate film therefrom.

From the observations made in Examples 1 and 2, it appears that upon the initiation of the dehydration of the silicate, the urea crystallizes at the surface of a film of the aqueous silicate glass composition, and that when such urea is in contact with the heated metallic surface, it preferentially wets the metallic surface and displaces the silicate glass film therefrom, at least until the film has dehydrated to the extent that it no longer itself wets the metallic surface and thus possesses substantially no affinity for the surface. Accordingly, the deposits of dehydrated glass are easily removable from the platens. At the operating temperature of the platens, the urea, after melting, decomposes to give gaseous degradation products and therefore has no deleterious effect upon the platens.

Example 3

An aqueous adhesive silicate glass composition containing 85% of an aqueous silicate glass having a solids content of 37.3% and a $Na_2O:SiO_2$ ratio of 1:3.3 is combined with urea, sodium bichromate, and triethanolamine in the proportions of 85½ parts of the aqueous silicate glass, 10 parts of urea, 0.2 part of sodium bichromate, and 0.3 part of triethanolamine. The urea is dissolved in the aqueous silicate glass, and the bichromate and triethanolamine are dissolved in a 2.3% NaOH solution, and this mixture added to the aqueous silicate glass containing the urea. This adhesive composition is used in a commercial unit for the manufacture of corrugated paperboard at speeds varying from 250–325 feet per minute. During the operation, the corrugating roll does not become fouled with the adhesive composition and the pressure roll remains clean throughout. Inspection of the platens during the operation indicates that the adhesive is momentarily deposited thereon, but removed therefrom so readily by the moving web that no damage to the web ensues. An examination of the platens, after shutting down the machine for reasons other than cleaning the platens, shows no deposit of the adhesive composition thereon.

While there have been described various embodiments of the invention, the methods described are not intended to be understood as limiting the scope of the invention as it is realized that changes therewithin are possible and it is further intended that each element recited in any of the following claims is to be understood as referring to all equivalent elements for accomplishing substantially the same results in substantially the same or equivalent manner, it being intended to cover the invention broadly in whatever form its principle may be utilized.

What is claimed is:

1. In a process of laminating webs of cellulosic material wherein heat and pressure are applied to effect lamination and, in consequence thereof, adhesive material is expressed from between the materials undergoing lamination and is deposited upon the heated laminating apparatus, finally to harden to a difficultly removable state thereon, the improvement which consists in applying between the webs in said process an adhesive bonding agent consisting of an aqueous adhesive sodium silicate glass composition having solids content of between 35 and 45% in quantity between about 80 and 97 parts by weight, the silicate constituent of which has a ratio of between about 2.5 to 4 parts $SiO_2$ to one part $Na_2O$ by weight of said aqueous silicate glass, and urea in quantity between about 20 and about 3 parts by weight.

2. A process as in claim 1 wherein said silicate glass composition has solids content of about 37.3% and the $Na_2O:SiO_2$ ratio thereof is about 1 to about 3.3.

3. A process as claimed in claim 2 wherein urea is present in quantity between about 14 and about 4 parts by weight of said adhesive bonding agent.

JAMES G. LANDER.

References Cited in the file of this patent

UNITED STATES PATENTS

| Number | Name | Date |
|---|---|---|
| 2,105,672 | Sadtler | Jan. 18, 1938 |
| 2,481,390 | Campbell | Sept. 6, 1949 |
| 2,481,391 | Campbell | Sept. 6, 1949 |